United States Patent [19]

Paioli et al.

[11] Patent Number: 4,582,335
[45] Date of Patent: Apr. 15, 1986

[54] BICYCLE FRAME HAVING A MODIFIABLE STRUCTURE

[75] Inventors: Laura Paioli; Primo Ricciotti; Antonio Gnudi, all of Bologna; Gianni Generali, Castenaso, all of Italy

[73] Assignee: Paioli S.p.A., S. Agata Bolognese, Italy

[21] Appl. No.: 736,584

[22] Filed: May 21, 1985

[30] Foreign Application Priority Data

May 25, 1984 [IT] Italy .................................. 3474 A/84
Jul. 3, 1984 [IT] Italy .................................. 3516 A/84

[51] Int. Cl.⁴ ...................... B62K 15/00; B62K 13/02
[52] U.S. Cl. .................... 280/278; 280/7.15; 280/7.16; 280/287
[58] Field of Search .................. 280/278, 287, 281 R, 280/7.1, 7.15, 7.16

[56] References Cited

U.S. PATENT DOCUMENTS

| 490,844 | 1/1893 | Draper | 280/287 |
| 3,088,747 | 5/1963 | Hahn | 280/287 |
| 3,608,917 | 9/1971 | Cogliano | 280/7.16 |
| 4,067,589 | 1/1978 | Hon | 280/278 |

Primary Examiner—John J. Love
Assistant Examiner—Donn McGiehan
Attorney, Agent, or Firm—Guido Modiano; Albert Josif

[57] ABSTRACT

The bicycle frame comprises a saddle tube, a steering head receiving a front fork rotatably therein, a frame top tube interconnecting top ends of the saddle tube and steering head, a front down tube interconnecting bottom ends of the saddle tube and steering head, and a rear fork assembly for supporting the rear wheel. The bottom ends of the saddle tube and front down tube are removably inserted and lockable in a crank axle block carrying the pedals. The front down tube and top tube have their front ends pivotally connected to the steering head and are provided with mutual locking means. A rear end of the top tube is connected to a sleeve positionable along the saddle tube.

8 Claims, 4 Drawing Figures

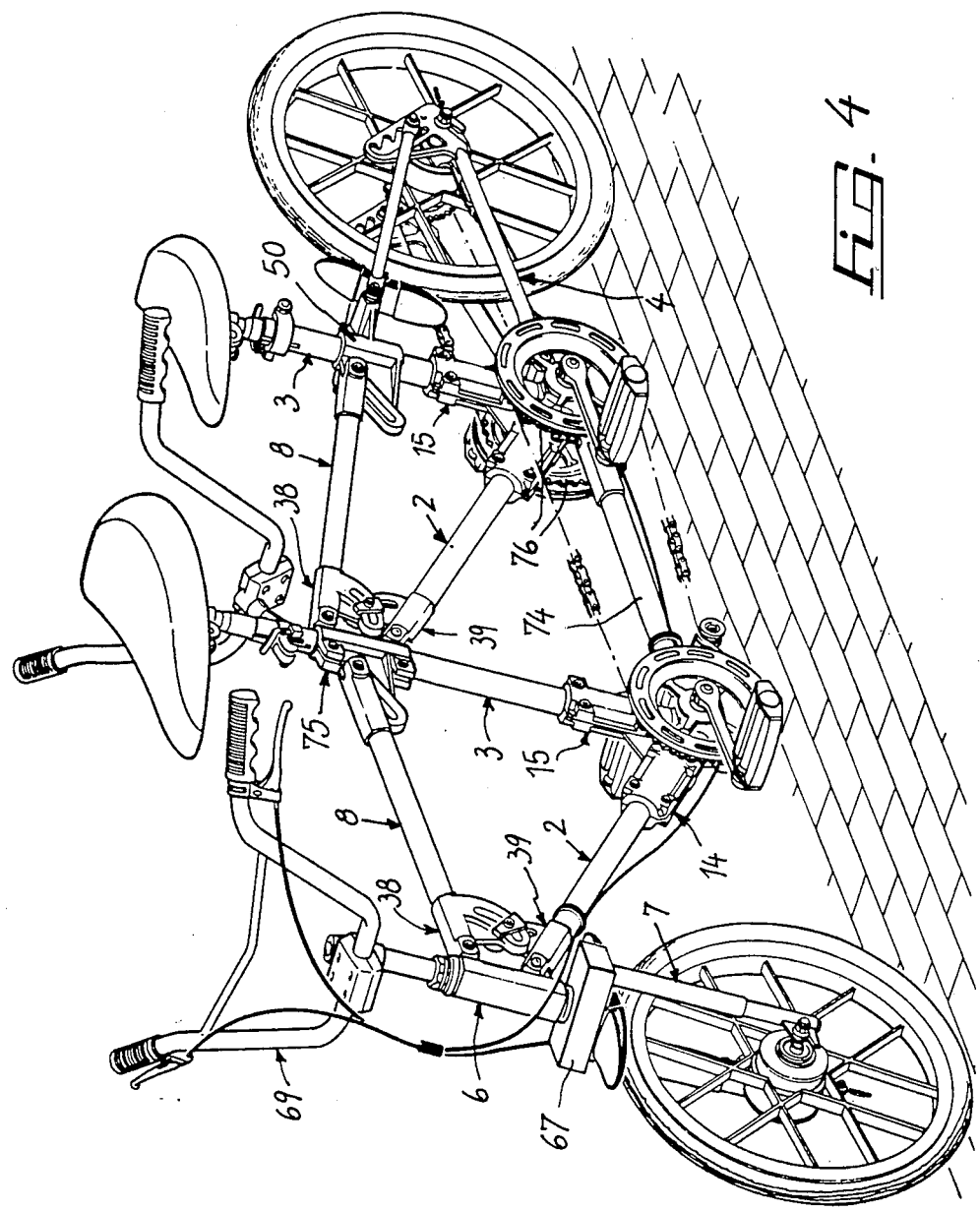

BICYCLE FRAME HAVING A MODIFIABLE STRUCTURE

BACKGROUND OF THE INVENTION

The present invention relates to a bicycle frame having a modifiable structure.

In order for existing bicycles to match the user's size, and provide for a confortable and safe ride and best performance of the vehicle, the adjustments that the user can make only concern the height of the handlebar and position of the saddle.

However, such adjustments only take into account the user's anthropometric parameters to a limited extent and are inadequate to adapt the bicycle for use by children, whose stature undergoes significant increments in few years. On the other hand, there is a demand for a bicycle which provides recreation for children, a means of transportation, and a creative amusement form.

SUMMARY OF THE INVENTION

It is the technical aim of this invention, therefore, to provide a bicycle frame having a structure which can be modified within broad limits and includes replaceable parts for constructing bicycles of different types and for different uses.

That aim is achieved by a bicycle frame comprising a saddle tube, a steering head receiving a front fork rotatably therein, a frame top tube interconnecting top ends of the saddle tube and steering head, a front down tube interconnecting bottom ends of the saddle tube and steering head and a fork assembly for supporting a rear wheel, characterized in that bottom ends of the saddle tube and front down tube are removably fitted and lockable in a crank axle block carrying the pedals, and that the front down tube and top tube have their front ends pivotally connected to the steering head and provided with mutual locking means, and that a rear end of the top tube is connected to a sleeve positionable along the saddle tube.

BRIEF DESCRIPTION OF THE DRAWINGS

Further features will become apparent from the following description with reference to the accompanying drawings, where:

FIG. 4 is a perspective view of a tandem bicycle.

DESCRIPTION OF THE PREFERRED EMBODIMENTS

Figure 1:
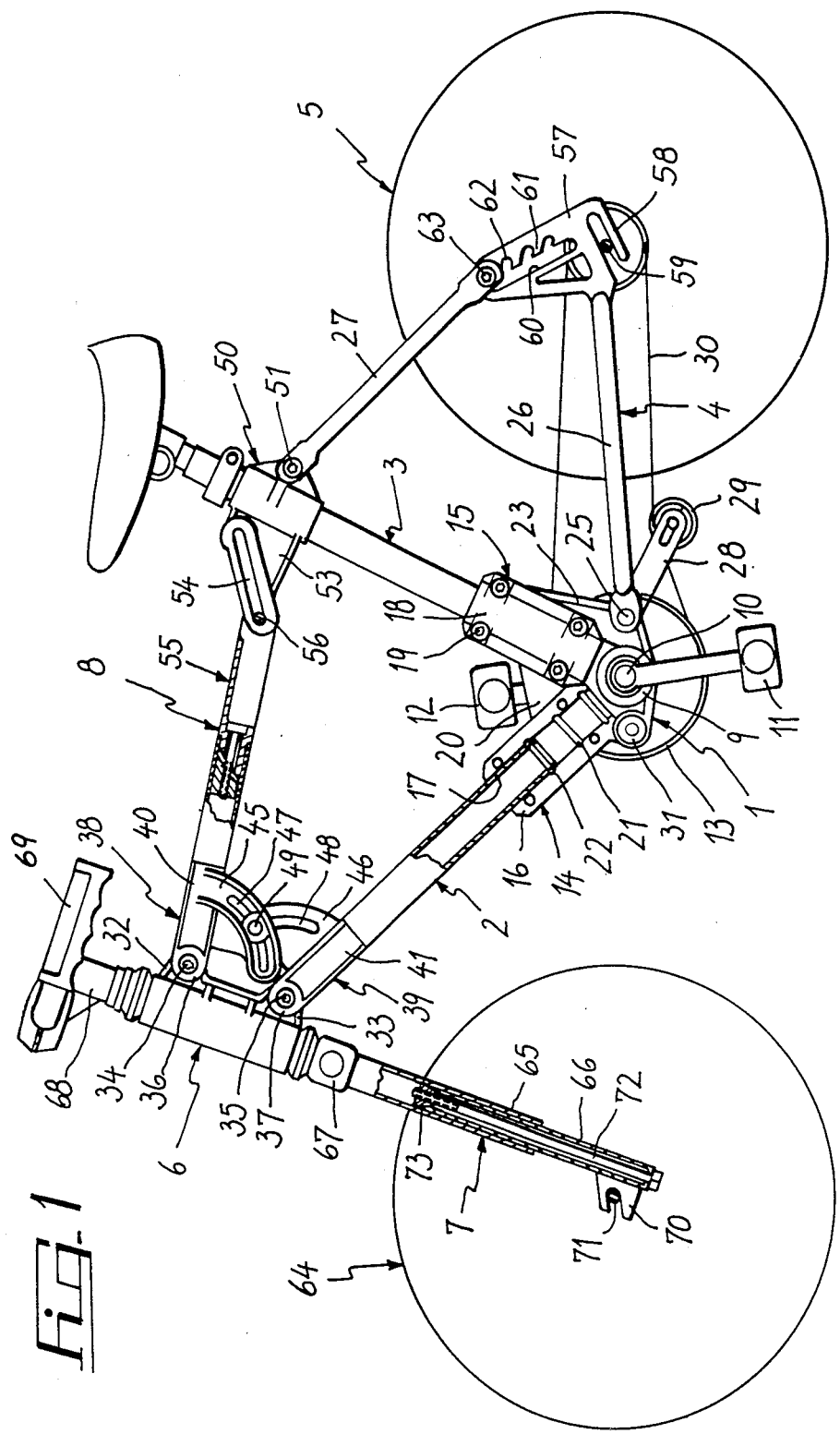
FIG. 1 is a side view of a bicycle incorporating the bicycle frame having a modifiable structure, according to the invention.

In the bicycle shown in FIG. 1, the frame comprises a crank axle assembly supporting block 1, a front down tube 2 (hereinafter referred to as down tube), a saddle tube 3, rear fork braces 4 supporting the rear wheel 5, a steering head 6 supporting the front fork 7, and a frame top tube 8.

The block 1 includes a cross tube 9 supporting the crank axle 10 rotatably therein and having the pedals 11,12 and sprocket wheel 13 attached thereto in a conventional way.

From the tube or sleeve 9 there extend upwards, with an angle of about 70° of divergence therebetween, two tubular bodies 14,15 whereinto the bottom ends of the down tube 2 and saddle tube 3 are inserted. To lock such ends, each tubular body comprises a jaw 16 attached to the tube 9 and formed with a semi-cylindrical seat 17, and a movable jaw 18 formed with a semi-cylindrical seat which, together with the seat 17, defines a cavity receiving the down tube 2 and saddle tube 3.

The jaws 18 are fastened to the jaws 16 by means of four screws 19. A triangular gusset 20 interconnects the jaws 16.

Formed in the seats defined by the jaws 16 and 18 are annular grooves 21 wherein a collar 22 engages which is formed at the bottom ends of the down tube 2 and saddle tube 3. By shifting the point of engagement of the collar 22 in the grooves 21 the distance of the tube 9 from the steering head 6 and the saddle may be varied. Attached to the rear of the tube or sleeve 9 is a gusset 23 from the opposite faces whereof there protrude tubular stub pipes 24 (see FIG. 2) perpendicularly thereto, on which there are journalled and locked, as by means of a throughgoing bolt 25, two braces 26 which form, together with two struts 27, the rear fork 4 for the rear wheel 5.

Attached to the underside of the gusset 23 is a bracket 28 carrying a roller 29 shiftable therealong for tensioning the chain 30, and in front of the tube 9 a drilled lobe 31 the function whereof will be explained with reference to FIG. 4.

Rearwardly of the steering head 6 there are two ears 32,33 drilled for the attachment, by bolts 34, 35, of yokes 36,37 formed on terminating bodies 38, 39 associated with the ends of the top tube 8 and down tube 2 through tangs 40,41.

Figure 3:
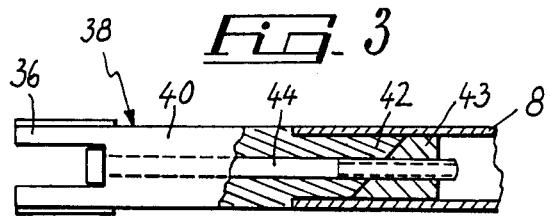
FIG. 3 is a partially sectional detail view of part of the bicycle frame of FIGS. 1 and 2.

For attaching the terminating body 38 to the top tube 8 (see FIG. 3), the tang 40 has an end 42 bevelled at 45°, whereagainst bears a chamfered face of a wedge 43, wherein a bolt 44 is threaded. The bolt 44 is passed axially through a hole formed in the tang 40 with appropriate play and its head is arranged to rest on a shoulder formed between the arms of the yoke 36. On tightening the bolt 44, the wedge 43 and tang 40 are urged against the inner wall of the down tube 2, thus locking the terminating body 38. In certain circumstances, elastic deformation of said bolt 44 will be sufficient to permit adequate displacement between the end 42 of the tang 40 and said wedge 43, to cause locking thereof in said top tube 8. The terminal body 39 is locked in the down tube 2 in exactly the same way.

The terminating bodies 38,39 also have wings 45,46 formed with slots 47,48 of arcuate shape with their centers of curvature at the pivot points formed by the bolts 34,35. The wings 45,46 are secured together, in a preset angular configuration, by a bolt 49 led through the crossover point of the slots 47,48.

A sleeve 50 is slidable along the saddle tube 3 which is cut off at the rear and lockable on the saddle tube by a bolt 51. The bolt 51 is passed through tubular formations 52 (see FIG. 2) extending crosswise and the top ends of the struts 27 which are thus secured at a suitable distance from each other.

A gusset 53 is attached to the front of the sleeve 50 which has a slot 54 extending forwards and downwards. An end fitting 55 having an inverted "U" cross-section and lockable on the gusset 53 by a bolt 56 passed through the legs of the "U" and slot 54 is disposed astride the slot 54. The fitting 55 is locked inside the top tube 8 by a device similar to that shown in FIG. 3.

For connecting the braces 26 and struts 27 which make up the rear fork assembly, attached to the ends of the braces 26 are respective lugs 57 which define open slots 58 at the bottom for supporting the hub 59 of the rear wheel 5. The lugs 57 are formed, above the open slot 58, with an aperture 60 the inside contour whereof has a plurality of teeth 61 defining notches 62 therebetween which open obliquely upwards. Engaged in the notches 62 are fastening bolts 63 for the struts 27, thereby the distance of the hub 59 from the bolts 51 may be adjusted, that is, the braces 26 may be raised or lowered in connection with the trimming of the rear fork assembly.

Likewise, to change the position of the front wheel 64, the front fork 7 comprises a pair of telescopic elements each including an outer tube 65 and an inner tube 66. The outer tubes 65 are attached to a cross-piece 67 rigid with the end of the shaft 68 carrying at its top end the handlebar 69.

Frontally attached to the inner tubes 66 are small plates 70 formed with forwardly open slots wherein the hub 71 of the wheel 64 is accomodated securely.

Inserted through the inner tubes 66 in an axial direction are threaded rods 72 which rest with their heads on the bottom ends of the tubes. The rods 72 are threaded through frustoconical blocks 73 adapted to be wedged in the tube tops are suitably slit longitudinally. By threading in the rods 72, the blocks 73 are caused to penetrate the tops of the inner tubes 66 which will be expanded to lock the outer and inner tubes together.

It may be appreciated from the foregoing that, by acting on the bolts 34,35,49 and 56, the bicycle frame may be altered as desired. The lengths of the saddle tube 3 and down tube 2 can be adjusted by shifting the collar 22 in the grooves 21 prior to tightening the jaws 16,18.

By acting on the forks 7 and 4, the center of gravity of the bicycle can be raised and lowered.

It should be noted that by removing the down tube 2 of the tubular body 14 and the bolt 56 from the slot 54, the bicycle can be split in two for convenience of transportation in a compact condition.

The frame disclosed herein may be completed with various accessory items to make differently structured bicycles.

Figure 2:
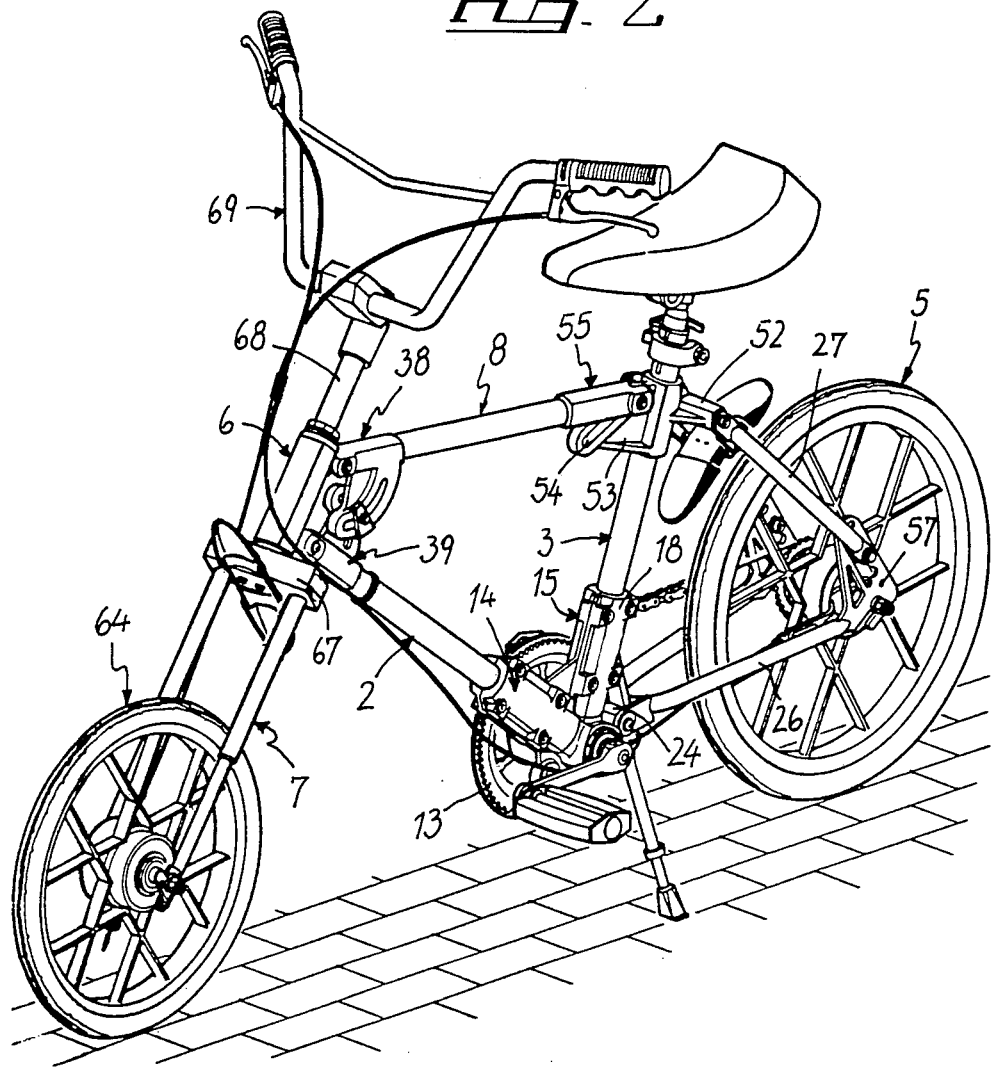
FIG. 2 is a perspective view of a modified bicycle having the same frame as the bicycle of FIG. 1.

As an example, by lengthening the telescoping elements which make up the front fork and inclining the steering head 6, a bicycle of the "chopper" type may be constructed having a smaller diameter front wheel than the rear one (see FIG. 2). In FIG. 4, there is shown a bicycle of the tandem type wherein two frames are joined together the identical elements of which are designated with the same reference numerals as in FIG. 1. For connecting the two frames together, a bottom tube 74 is provided which extends between the gusset 23 of the front block 1 and the lobe 31 of the rear block. Further, on the saddle tube 3 of the front frame there is a sleeve 75 which differs from the sleeve 50 by the presence, on the rear, of a pair of ears similar to the ears 32,33 for attaching the top tube 8 and down tube 2 of the rear frame. Furthermore, on the rear crank axle there would be provided a double sprocket 76 for the drive chain.

We claim:

1. A bicycle frame comprising a saddle tube, a steering head receiving a front fork rotatably therein, a frame top tube interconnecting top ends of the saddle tube and steering head, a front down tube interconnecting bottom ends of the saddle tube and steering head, and a rear fork assembly for supporting a rear wheel, wherein bottom ends of the saddle tube and front down tube are removably inserted and lockable in a crank axle block carrying the pedals, the front down tube and top tube have their front ends pivotally connected to the steering head and provided with mutual locking means, and a rear end of the top tube is connected to a sleeve positionable along the saddle tube.

2. A bicycle frame according to claim 1, wherein said crank axle block comprises a tube supporting a crank axle and having two diverging tubular bodies each including a movable jaw adapted for coupling by means of screws with a jaw attached to said tube, said jaws defining a cylindrical seat for engagement with the front down tube and saddle tube.

3. A bicycle frame according to claim 2, wherein, in said cylindrical seat there are formed annular grooves for engagement with a collar formed at the ends of the saddle tube and front down tube.

4. A bicycle frame according to claim 1, wherein said mutual locking means are adapted for locking the front down tube and top tube together and comprise terminating bodies provided with tangs associated with the front down tube and top tube, and with wings having arcuate slots defining centers of curvature at pivot points of said front down tube said top tube in said steering head, said wings being adjacent each other and made rigid to each other by a bolt led through a slot crossover point.

5. A bicycle frame according to claim 1, wherein said sleeve attached to said top tube has on a front portion thereof a gusset formed with a slot extending forwards and downwards which is overlaid by an end fitting having an inverted "U" cross-section lockable by a bolt led crosswise through said end fitting and said slot.

6. A bicycle frame according to claim 1, wherein said rear fork assembly comprises two braces journalled on a gusset of the block and two struts journalled on said sleeve, with ends of said braces there being rigidly connected wings wherein a plurality of notches are formed for engagement with ends of said struts.

7. A bicycle frame according to claim 1, wherein said front fork comprises a pair of telescopic elements each including an outer tube and an inner tube, means being provided for locking said inner tube and said outer tube together.

8. A bicycle frame according to claim 1, wherein said sleeve comprises a pair of wings for attachment of said top tube and said front down tube of a second frame to construct a tandem bicycle, said blocks for fitting the saddle tubes and front down tubes being interconnected by a bottom tube.

* * * * *